B. BIGGS.
METHOD OF MOLDING CONCRETE SILOS.
APPLICATION FILED MAY 15, 1917.

1,286,211.

Patented Dec. 3, 1918.
2 SHEETS—SHEET 1.

WITNESSES

INVENTOR
Benjamin Biggs
BY Victor J. Evans
ATTORNEY

B. BIGGS.
METHOD OF MOLDING CONCRETE SILOS.
APPLICATION FILED MAY 15, 1917.
1,286,211.
Patented Dec. 3, 1918.
2 SHEETS—SHEET 2.
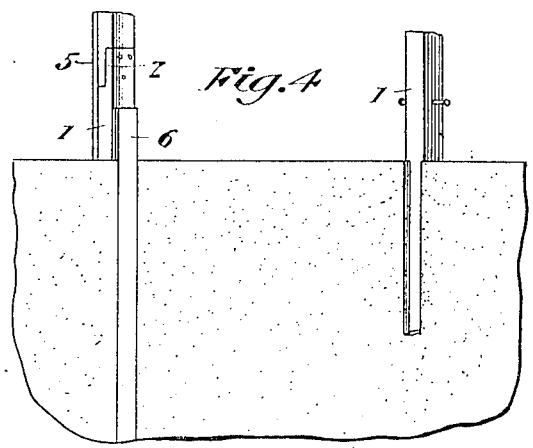
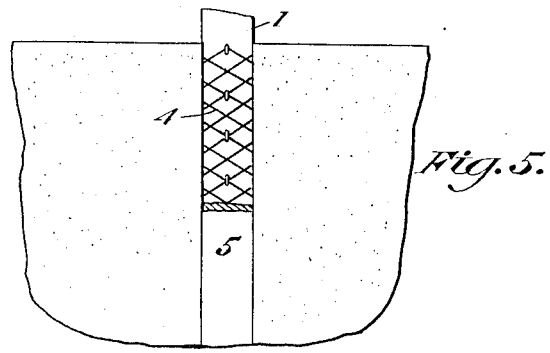
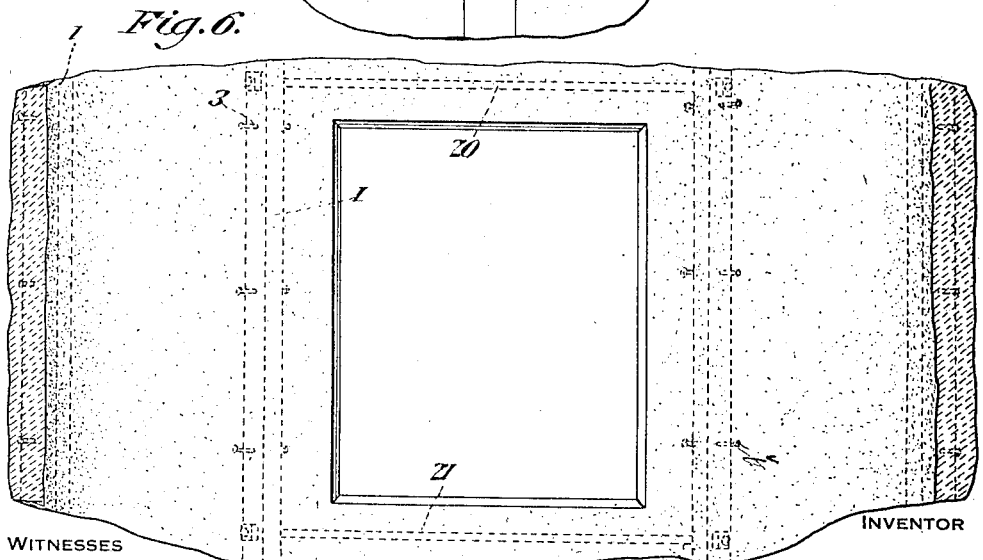
WITNESSES
INVENTOR
Benjamin Biggs
BY Victor J. Evans
ATTORNEY

UNITED STATES PATENT OFFICE.

BENJAMIN BIGGS, OF MABTON, WASHINGTON.

METHOD OF MOLDING CONCRETE SILOS.

1,286,211. Specification of Letters Patent. Patented Dec. 3, 1918.

Application filed May 15, 1917. Serial No. 168,755.

*To all whom it may concern:*

Be it known that I, BENJAMIN BIGGS, a citizen of the United States, residing at Mabton, in the county of Yakima and State of Washington, have invented new and useful Improvements in Methods of Molding Concrete Silos, of which the following is a specification.

This invention relates to masonry and concrete structures, and more especially to a method of molding cylindrical buildings such as silos whose walls are made up of wood and plastic; and the object of the same is to produce an improved and serviceable silo from these materials accessible to the average farmer, by means so simple and so readily practised as to render the operation and the product possible to the man who needs the building. Silo walls of wood and concrete are now made in haphazard fashion, usually by the boy on the farm with the aid of an unskilled hand or two, working at odd moments and seeking to accomplish much at times when they are not otherwise engaged. Almost invariably the result is a structure in which the wooden parts are more or less exposed to moisture or dampness which of course will cause them to swell when they become wet. The silo at first looks nice, stands up well, and serves its purpose for a time, but eventually it cracks or disentegrates, even though the mixture of cement and sand may have been a proper one and the work well done in the light of the knowledge possessed. My purpose is to successfully construct a circular or cylindrical silo or like building of the same materials and in the same general manner, but in such way that the defects mentioned will not appear in time and the building will retain its usefulness indefinitely. In the erection of such a structure I follow a certain course which is necessarily hereinafter described somewhat in detail as the method of building this silo rather than the finished article, and in reading the following specification reference must be had to the accompanying drawings wherein:—

Fig. 4 is an inside elevation of Fig. 3, showing one of the studs continued upward and a second stud element connected with the first by a shoulder joint, and showing part of the opening left by the removed strip as filled with cement or "pointed up."

Fig. 5 is an outside elevation of a small portion of the wall after the initial pouring and setting of the cement and the removal of the form, showing the lower portion of one of the outer strips in place as yet and the upper portion as broken away or removed to disclose a slot or opening (the wire being seen therein) which opening must later be pointed up.

Fig. 6 is an inside elevation of a considerable portion of what might be called the front side of the wall of a silo so that the door opening is seen from within, the position of the bolts and studs being indicated by dotted lines but the door and its frame being absent.

Figure 1:
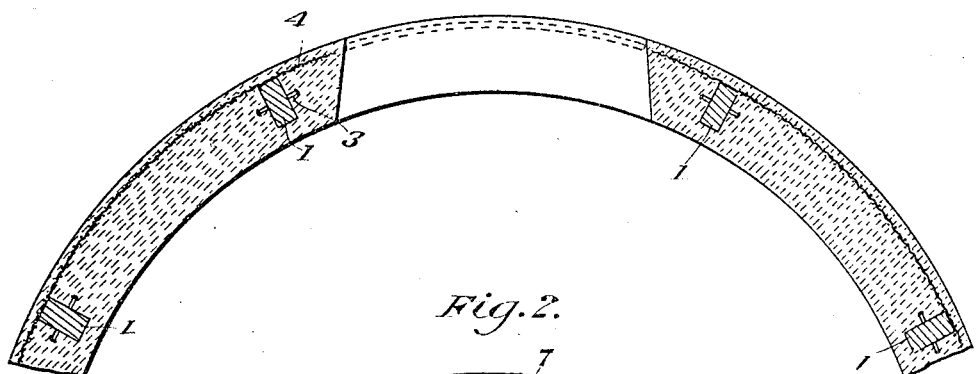
Figure 1 is a horizontal section through a portion of the wall of the completed article, the section being also taken through a door opening in its finished condition. I may here state that I make no claim to the door itself, nor the manner of mounting it within its frame.
Figure 2:
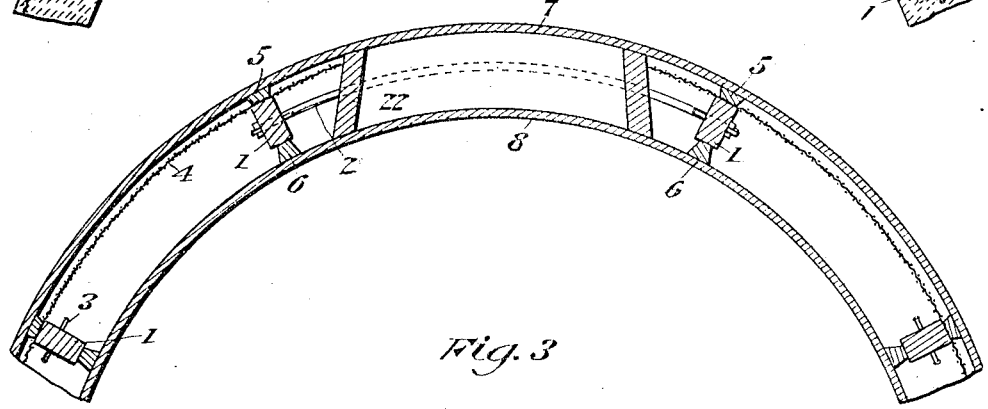
Fig. 2 is a horizontal section illustrating the wooden members of the wall structure and the form in which it is made or into which the cement is poured, the metal reinforce being indicated as attached to the outer faces of the studs.
Figure 3:
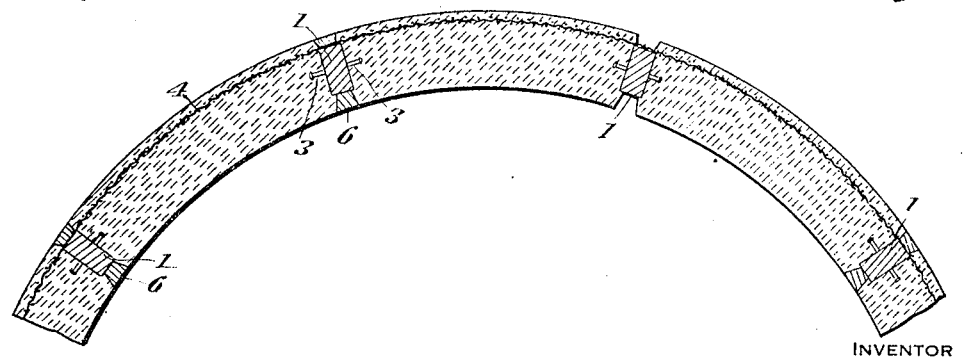
Fig. 3 is a similar section illustrating a portion of the wall after the cement has been poured and allowed to set, and with the outer and inner form boards and one each of the outer and inner strips removed, and this section omits the door opening.

In building this silo upright 2x4 studs 1 are disposed at intervals of about two feet apart, their lower ends mounted on or embedded in the cement of a foundation, if there be one or possibly resting on and toe-nailed to a wooden sill mounted thereupon, the length of these studs being that of the available lumber ready to hand, and not necessarily the full height of the silo to be built. Any appropriate means may be employed to hold these studs while the cement is being poured, but we will omit discussion of the bracing, shoring, and scaffolding. I might say here that short pieces of studs may be used, and from time to time as the building rises the shorter lengths will be lengthened by adding other lengths thereto, by means of shoulder joints as indicated at 2. I prefer to put the studs with their four-inch dimensions radial to the building. Where a door is to occur, the contiguous studs may be disposed farther apart, as it is not necessary that they stand at two-foot intervals and they might be either more or less. In the wide side faces of the studs are driven ten-penny nails 3, leaving a considerable portion of their shanks projecting from each stud toward the next. Around the substantially circular skeleton structure thus made is carried wire netting 4 of appropriate gage and mesh, and ordinary hog wire fencing will answer, and this is attached to the outer edges of the studs by nails or staples. The netting strip may be carried straight around the structure, or spirally, but of course the netting is omitted opposite any place where a door opening is to occur. On the outer edges of the studs, over the line of staples which attach the netting, are laid strips 5 such as laths, held in place by small nails or tacks. Against the inner edges of the studs are laid strips 6 of dove-tailed section, with their narrower edges toward the studs and their wider edges inward, and these strips are also held removably in place by nails as indicated. I prefer that the inner strips 6 be somewhat thicker, radially of the building, than the laths 5 constituting the outer strips. Outer and inner form boards 7 and 8 are now bent and put in place, the former around the outer strips and the latter around the inner strips, and these boards are held in place in any suitable manner as by being wired to the studs above and below the section being made. These boards may be secured at the average saw mill, and are as thin as necessary to permit them to be bent and as long as necessary to reach completely around the structure either in one length or more. They may be bent more readily if they are first steamed or otherwise heated and moistened, and after having been once put in place they are more readily removed if they are in two or more pieces each. The width of the boards may be such as is obtainable, and if they are perhaps six or eight inches wide two or three may be disposed edge to edge on both the inner and outer faces of the structure to make up a section. Now the cement is poured, having first been mixed in the proper proportions and at a convenient point, and when poured it flows in between the studs, reaching from the outer to the inner boards, passes completely through and thoroughly envelops the meshing of the wire netting, and contacts with both edges of all strips. Yet it does not pass between the outer strips and the studs and outer boards, nor between the inner strips and the studs and inner boards. Later when the boards are removed (after the cement has set) the nails can be withdrawn from the outer and inner strips and these strips taken out of place; and subsequently the cracks so left are closed by "pointing up" with a rather rich mixture of sand and cement as well understood. If the strips are of sufficient length, the form boards may be moved upward after the first section is poured, and wired to the studs for the pouring of a second section; but if the strips are not of sufficient length they may be detached and moved upward and nailed again onto the studs before the boards are applied for the pouring of a second section. This section should be poured directly onto the top of the first section laid and set, first moistening the latter carefully so that the two sections will adhere. From time to time, when a short length of stud is reached, an addition will be made thereto by a shoulder joint as above suggested. I would advise that before any studs are put in place they be thoroughly soaked in water, and the result will be that the studs will not swell within the wall after the cement is poured. By following this method of building a silo or similar circular building, the wall is built in horizontal sections at intervals of a day or two apart, and the same form boards, and perhaps the same strips may be repeatedly used as the structure advances upward along the studs. For the latter short pieces may be employed by splicing them as suggested. Eventually the structure reaches the desired height and is leveled off, and all studs are sawed off at one level and all strips removed and the spaces exposed thereby well pointed up. Finally the roof is put in place, but this forms no part of the present invention.

By preference a silo is provided with at least one door. As far as my invention is concerned, this door is but an opening into which latter is set a frame, and within the frame there is hung a door. The opening is formed by disposing two contiguous studs a little farther apart than the two-foot intervals suggested, and placing between these studs a framing 22 of ordinary lumber whose side and top boards may be set a little oblique so that the edges of the door-opening converge toward the exterior of the building; and in pouring the cement it is allowed to come close against the framing all around the door opening. Later when the framing is removed, the door-frame takes its place and may be held in place by any suitable means. I prefer to connect the two contiguous studs on opposite sides of the door by a bolt 20 above the door-opening and perhaps another bolt 21 beneath the door opening.

A silo constructed by carefully following the course above given and by using proper materials, all of which are readily available to the average farmer, will be comparatively inexpensive, strong, serviceable, and durable, and particularly free from the cracks and other deterioration which results from settling, changes in temperature, and the deterioration of structures of this kind which takes place with time. One of the chief difficulties encountered by inexperienced persons in building a structure such as described, and which to the more experienced is extremely simple, is that of holding the form boards at proper distances away from the studs during the setting of the plastic. This I obviously accomplish by the use of the strips, and for these I prefer laths on the exterior and strips a little thicker than laths on the interior, and these ought to be dove-tailed in cross section as shown. If the netting is attached to the outer faces of the studs, the plastic on the outside of the latter will be eventually of a thickness equal to that of the laths, and when the spaces which the laths expose are filled by pointing up the netting and its fastening staples will be entirely concealed. So also with the spaces exposed by removing the dove-tailed strips on the interior. All strips are necessarily narrower than the 2x4 studding in either direction, and the result is that the plastic as first poured flows across and adheres to both flat sides of each stud and flows partly around and adheres to both edges thereof, so that only the pointing up is needed to completely envelop the stud. The nails driven into the latter afford a splendid "cling" for the cement between the studs, and of course the wire netting is an ideal metal reinforce for a wall structure of this kind. Eventually the studs are completely incased, and as no moisture can get to them they are thoroughly protected by the cement.

What is claimed as new is:—

1. The herein described method of producing a wood and plastic wall structure which consists in placing upright studs in a line, securing upright strips to the outer and inner edges of said studs and lengthwise thereof for supporting form boards, filling the space between said form boards with plastic material, removing said form boards and strips, and pointing up the spaces exposed by the removal of said strips.

2. The herein described method of producing a curved wall of wood and plastic which consists in placing a series of upright studs in a ring at proper intervals, securing strips of dove-tailed cross sections to the outer and inner edges of said studs with the narrow faces of the strips next to studs so as to leave a portion of the latter exposed, applying form boards to the outer edges of said strips, filling the spaces between the boards and between the strips with plastic material and permitting the same to flow over the exposed portions of the studs, removing said boards and strips after said material has set, and finally pointing up the spaces exposed by the removal of the strips.

3. The herein described method of producing a cylindrical silo wall composed of wood and reinforced concrete, the same consisting in first placing a series of upright studs in a ring with their largest dimension radial to said ring, next inclosing the ring with wire netting and attaching it to the outer edges of all studs, next securing to the inner edges of all studs and to the outer edges thereof over the netting strips of dove-tailed cross sections with their narrow edges next to the studs so as to leave a portion of the latter exposed at both sides of the strips, next attaching form boards to the outer faces of the outer strips and the inner faces of the inner strips, next pouring liquid cement in the spaces between the boards and between the studs and permitting it to flow through said netting and over the exposed portions of said studs and allowing it to set, next removing the form boards and strips, and finally pointing up the spaces exposed by the removal of the latter so that all edges of the studs are covered and the netting is fully embedded.

In testimony whereof I affix my signature.

BENJAMIN BIGGS.

Copies of this patent may be obtained for five cents each, by addressing the "Commissioner of Patents, Washington, D. C."